US012619470B2

(12) United States Patent
Bosch et al.

(10) Patent No.: US 12,619,470 B2
(45) Date of Patent: May 5, 2026

(54) ASSESSING SECURITY VULNERABILITIES IN CLOUD-NATIVE APPLICATIONS

(71) Applicant: Cisco Technology, Inc., San Jose, CA (US)

(72) Inventors: Hendrikus G.P. Bosch, Aalsmeer (NL); Randy Birdsall, Fulton, MD (US); Alessandro Duminuco, Milan (IT); Zohar Kaufman, South Natanya (IL); Sape Jurriën Mullender, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 609 days.

(21) Appl. No.: 17/662,459

(22) Filed: May 9, 2022

(65) Prior Publication Data

US 2023/0004445 A1    Jan. 5, 2023

Related U.S. Application Data

(60) Provisional application No. 63/217,045, filed on Jun. 30, 2021.

(51) Int. Cl.
| | |
|---|---|
| *G06F 9/46* | (2006.01) |
| *G06F 9/50* | (2006.01) |
| *G06F 9/54* | (2006.01) |

(52) U.S. Cl.
CPC ............ G06F 9/5072 (2013.01); G06F 9/505 (2013.01); G06F 9/541 (2013.01); G06F 9/547 (2013.01)

(58) Field of Classification Search
CPC ........ G06F 9/5072; G06F 9/505; G06F 9/541; G06F 9/547
See application file for complete search history.

(56) References Cited

U.S. PATENT DOCUMENTS

| | | | |
|---|---|---|---|
| 11,030,068 B1 | 6/2021 | Agarwal | |
| 2017/0337123 A1 | 11/2017 | Wang | |

(Continued)

FOREIGN PATENT DOCUMENTS

CN      110955899 A  *  4/2020  ........... G06F 21/577

OTHER PUBLICATIONS

Market Insight Report Reprint, Liam Rogers, "Observability primer: Is it just monitoring 2.0?" S&P Global Market Intelligence, Oct. 5, 2021, 5 pgs.

(Continued)

*Primary Examiner* — Diem K Cao
(74) *Attorney, Agent, or Firm* — Baker Botts L.L.P.

(57) ABSTRACT

According to some embodiments, a method is performed by a distributed cloud-native application. The method comprises receiving a request from a user to perform an operation. The user is associated with a risk profile. The method further comprises determining a call path through the distributed cloud-native application to perform the operation and classifying a risk level associated with the determined call path based on a distributed call graph. The distributed call graph comprises a risk value for each call path through the distributed cloud-native application and each call path comprises one or more distributed cloud-native application components. The risk value is based on a weakness rating associated with each component in the call path. The method further comprises determining the risk level associated with the determined call path is acceptable based on the risk profile associated with the user and performing the operation.

20 Claims, 2 Drawing Sheets

200

(56) References Cited

U.S. PATENT DOCUMENTS

| | | | | |
|---|---|---|---|---|
| 2020/0082095 | A1 | 3/2020 | Mcallister | |
| 2020/0097662 | A1 | 3/2020 | Hufsmith | |
| 2020/0327044 | A1* | 10/2020 | Pi | G06F 11/3684 |
| 2021/0073107 | A1 | 3/2021 | Sharma | |
| 2021/0377217 | A1* | 12/2021 | Antoche Albisor | G06F 21/577 |
| 2022/0100852 | A1* | 3/2022 | Cervantez | G06F 21/562 |

OTHER PUBLICATIONS

Stephen Elliot, Mark Leary, "Full-Stack Observability: Expanding the Digital Experience and Impact with Advanced Business Context," , IDC, Nov. 2021, 19 pgs.

International Search Report corresponding to PCT/US2022/073069 dated Sep. 29, 2022, 15 pages.

* cited by examiner

200

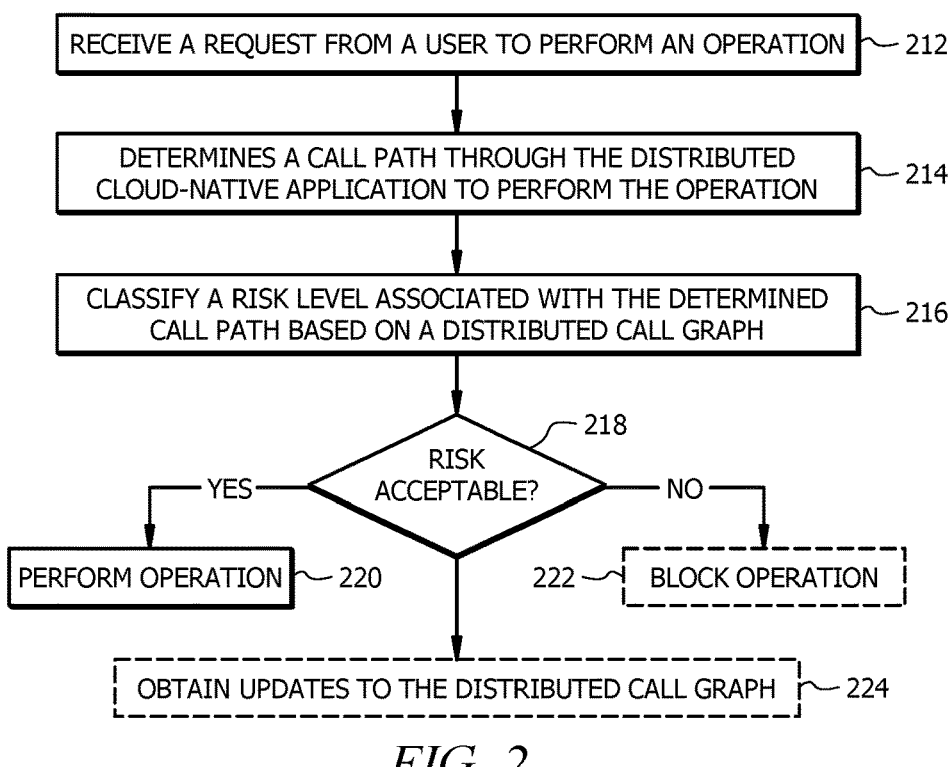

RECEIVE A REQUEST FROM A USER TO PERFORM AN OPERATION —212

DETERMINES A CALL PATH THROUGH THE DISTRIBUTED
CLOUD-NATIVE APPLICATION TO PERFORM THE OPERATION —214

CLASSIFY A RISK LEVEL ASSOCIATED WITH THE DETERMINED
CALL PATH BASED ON A DISTRIBUTED CALL GRAPH —216

218
RISK
ACCEPTABLE?

YES

NO

PERFORM OPERATION —220

222— BLOCK OPERATION

OBTAIN UPDATES TO THE DISTRIBUTED CALL GRAPH —224

*FIG. 2*

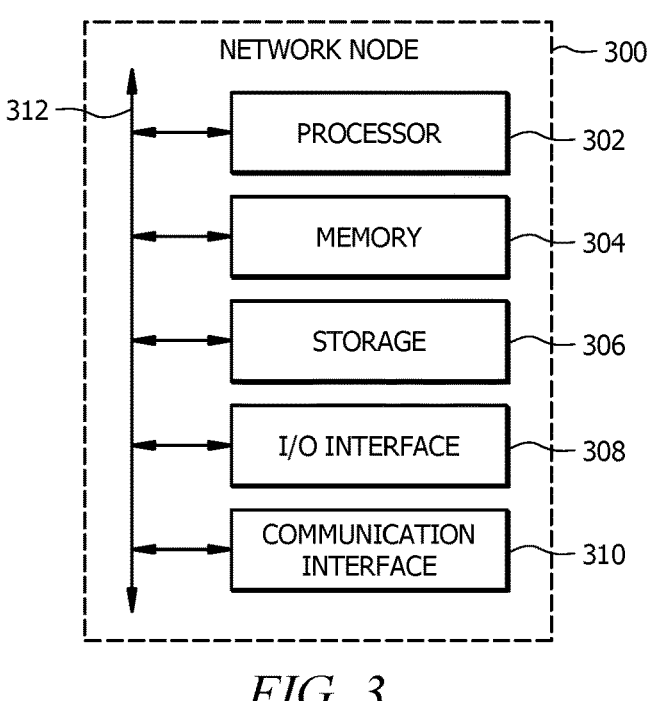

NETWORK NODE —300

312

PROCESSOR —302

MEMORY —304

STORAGE —306

I/O INTERFACE —308

COMMUNICATION
INTERFACE —310

*FIG. 3*

ASSESSING SECURITY VULNERABILITIES IN CLOUD-NATIVE APPLICATIONS

RELATED APPLICATIONS

This application claims priority to U.S. Provisional Application Ser. No. 63/217,045 entitled "Assessing Security Vulnerabilities in Cloud-Native Applications," filed Jun. 30, 2021, the entire content of which is incorporated herein by reference.

TECHNICAL FIELD

This disclosure generally relates to cloud computing, and more specifically to assessing security vulnerabilities in cloud-native applications.

BACKGROUND

Being cloud-native is an approach to building and running applications that fully use the advantages of the cloud model. A cloud-native application uses a collection of tools that manage and simplify the orchestration of the services that make up the application. These services, each with its own lifecycle, are connected by application programming interfaces (APIs) and are deployed as containers. The containers may be orchestrated by a container scheduler that manages where and when a container should be provisioned into an application and is responsible for lifecycle management.

Cloud-native applications are designed to be portable to different deployment environments: for example, in a public, private, or hybrid cloud. Continuous delivery and DevOps are methods used to automate the process of building, validating, and deploying services into a production network.

Securing the public cloud is an increasingly difficult challenge for businesses. As a result, information technology (IT) departments are searching for cloud security solutions that provide sufficient end-user security.

BRIEF DESCRIPTION OF THE DRAWINGS

For a more complete understanding of the disclosed embodiments and their features and advantages, reference is now made to the following description, taken in conjunction with the accompanying drawings, in which:

FIG. 2 is a flow diagram illustrating a method performed by a distributed cloud-native application, according to some embodiments; and FIG. 3 is a block diagram illustrating an example cloud-native application host server, according to particular embodiments.

DESCRIPTION OF EXAMPLE EMBODIMENTS

Overview

Figure 1:
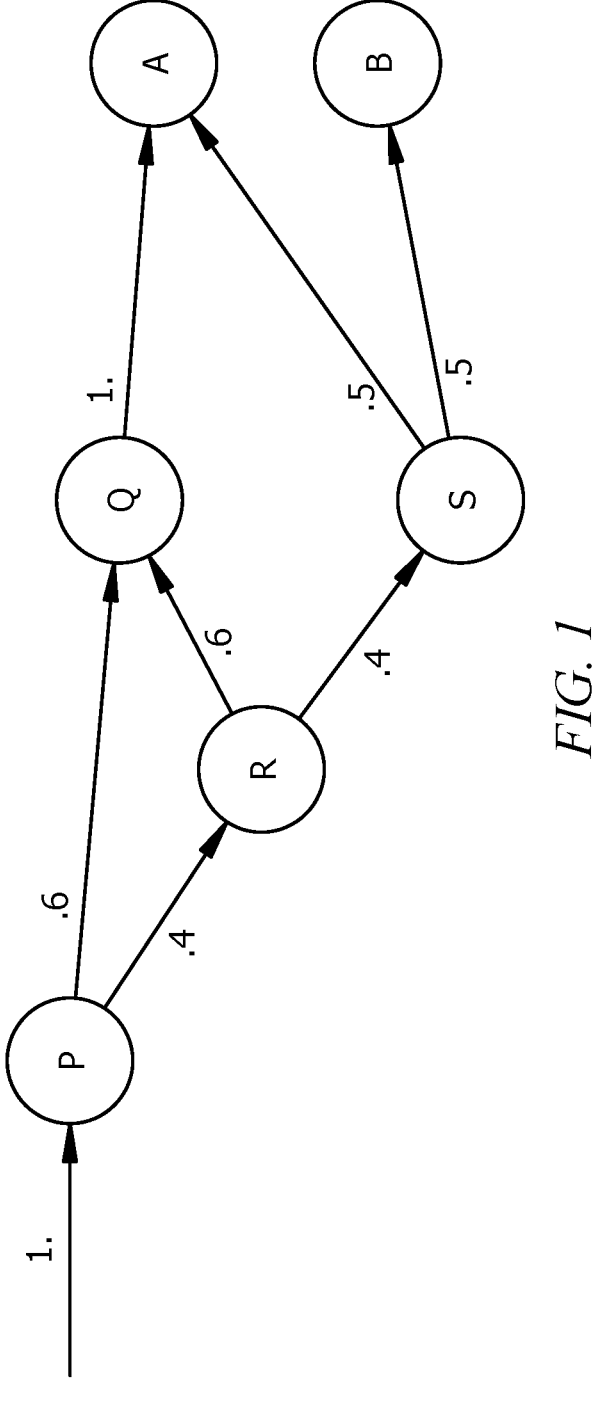
FIG. 1 is a call graph for a cloud-native application.

Cloud-native applications are, in essence, highly distributed applications and assessing if such applications are vulnerable to hacking attempts is difficult. First, understanding which application parts are used in the distributed set of application components is often not known until the application runs. Then, with the introduction of external application programming interface (API) services, understanding how such components integrate with the main application complicates security analysis further. Tracing API services is more difficult if such functions are not owned by the enterprise managing the application. Lastly, cloud-native applications carry data between the various components, some of which may be sensitive. Understanding and controlling what data goes where is instrumental to reducing security risk.

It is important to track the operations of cloud-native applications and capture their operations to enable security personnel and/or developers, with their tooling, to assess where applications are vulnerable. When security personnel and/or developers can automatically assess such vulnerabilities, they can mitigate the risk of such vulnerabilities and install specific security policies to quarantine certain application aspects, restrict distribution of sensitive data to such application components, report and instruct development teams to get the application security fixed and more.

Particular embodiments include mapping customer requests against cloud-native applications and, using a risk/reward scheme, determining if proceeding with the customer request falls within the operating mode of the enterprise hosting the cloud-native application and/or the customer. The risk is based on building a distributed call graph of the application using existing tracing techniques and then augmenting the call graph with known vulnerabilities and weaknesses for all application assets and by performing dynamic testing against application components.

According to some embodiments, a method is performed by a distributed cloud-native application. The method comprises receiving a request from a user to perform an operation. The user is associated with a risk profile. The method further comprises determining a call path through the distributed cloud-native application to perform the operation and classifying a risk level associated with the determined call path based on a distributed call graph. The distributed call graph comprises a risk value for each call path through the distributed cloud-native application and each call path comprises one or more distributed cloud-native application components. The risk value is based on a weakness rating associated with each component in the call path. The method further comprises determining the risk level associated with the determined call path is acceptable based on the risk profile associated with the user and performing the operation.

An advantage of particular embodiments is that enterprises hosting cloud-native applications and the customers using these applications can determine, on a measurable scale (e.g., monetary) whether they wish to risk executing the customer request. By being able to do this on a transaction by transaction basis, both the enterprise hosting the application and the customer using the enterprise application have a granular mechanism for risk/reward control.

EXAMPLE EMBODIMENTS

Particular embodiments capture the nature of the distributed cloud-native application by capturing its operations and their parameters in a call-graph. Such a call graph can then form the basis of an application model, which then forms the basis for security vulnerability analysis. Vulnerabilities can be found, e.g., by scanning image containers and matching their hashes to entries in well-known vulnerability databases; specific penetration testing can be triggered against API service functions when models are integrated in developer continuous integration (CI)-chains through grey-box or white-box testing and fuzzing.

Call-graph construction may use existing distributed tracing methods, including, but not limited to Jaeger, OpenTracing, OpenTelemetry or other ad-hoc distributed tracing techniques. If distributed tracing is not available, particular embodiments rely, e.g., on tracking remote procedure call (RPC) calls through the cloud-native application by instrumenting cloud-native side cars, e.g., Istio/envoy, to build up a call graph by tracking all intra- and inter-application message flows.

Particular embodiments build a call graph representative of the distributed cloud-native application capturing all the key application components and how application components are used during operation. Particular embodiments record image hashes, file names, line numbers and functions activated in each of the components of the distributed cloud-native application, the repository these are kept in, the parameters that are carried between the application components of the cloud-native enterprise application and the dependencies on external API services.

Particular embodiments assess, using the application call graph, if the execution of customer requests against the cloud-native application poses an acceptable or unacceptable risk for the enterprise hosting the application and/or the customer executing the transaction. If the risk is unacceptable, particular embodiments block and/or report this upfront before the customer transaction even starts. Stating what are acceptable/unacceptable risks is a combination of the customer's input, the enterprise input or a combination thereof and is likely based on monetary and/or reputation incentives.

For example, assume a call graph represents an airline application hosted as a cloud-native application and the airline application addresses all functions for ordering airline tickets. Mapping the value of the operation for the enterprise on the application call graph (say, buying a ticket for a customer) leads to a risk/reward mapping. The reward is selling the ticket, the risk is that when a bad actor steals credit card information, personal information, or simply disrupts the transaction, the enterprise suffers monetary and/or reputation damages. If ordering a ticket means that the application executes functionality in a container that is built with images that have serious configuration or software vulnerabilities, and the customer states its policy that under no circumstances shall its identity be exposed to bad software, the customer transaction can be blocked on ingress. The call graph may facilitate many different kinds of policies.

Building a distributed call graph across a cloud-native application is known technology. Jaeger, Opentelemetry and Opentracing provide a series of techniques to build a call graph between the various components. These techniques rely on augmenting the application sources, tying incoming hypertext transfer protocol (HTTP) requests to outgoing HTTP requests, augmenting these requests with the appropriate tracking identities and collecting all records with such information in a central repository. Recently, Opentracing has also been made available for Istio/Envoy, thereby making it possible to trace even over application components that have not been augmented with trace functions, albeit that in such cases call graphs are more likely statistical rather than precise.

After a call graph has been established for the cloud-native application, particular embodiments augment the call graph with risks and vulnerabilities. As a non-exhaustive list, particular embodiments may perform one or more of the following functions.

Some embodiments map all known vulnerabilities to image layers, images and libraries used to build an application component to all vertices in the call graph. For this, particular embodiments use common vulnerabilities and exposures (CVEs), common weakness enumerations (CWEs), and their mapping onto common vulnerability scoring system (CVSS) score, Open Web Application Security Project (OWASP) top 10 and OWASP API top 10 issues and extend these considerations to all HTTP endpoints implemented by an application component (e.g., container).

Some embodiments scan the software implementation of specific HTTP endpoints for vulnerabilities (e.g., during the CI cycle of building the application) and/or test (e.g., dynamic application security testing (DAST)) those software components for vulnerabilities. Found vulnerabilities may further augment the call graph.

Some embodiments chaos-test and fuzz-test internal application components (internal API services) by executing deliberate tests against those services that may break such internal services and/or affirm their operation.

Some embodiments assess the quality of external assets such as external API services. For this, particular embodiments query external telemetry providers for observed anomalies (e.g., broken transport layer security (TLS) implementations, expired certificates, bad reputation services, low usage services, malware/adware sites, bad classification, incorrect domain name system (DNS) or network posture, etc.) and/or execute chaos/fuzz tests against those external API services.

FIG. 1 is a call graph for a cloud-native application (i.e., a distributed call of an application). As illustrated, all incoming traffic arrives at P. P receives all incoming traffic and splits its traffic to Q and R at a 60%/40% split. Q then sends all its traffic to an external service A, etc. All traffic exposed to Q is vulnerable for issues in A, while P is only 60% dependent on Q and 40% dependent on R because vulnerabilities and weaknesses are transitive.

The result of the mapping and testing of the cloud-native application components is an augmented graph that reflects for each path through the graph, the risks, vulnerabilities, and weaknesses a customer call may be exposed to. Particular embodiments capture these issues in a risk vector, with the most severe issues weighted more than less severe consideration.

Thus, the vector for P includes all vulnerabilities of the application. Then, for each incoming customer request to the cloud-native application, particular embodiments execute a classification of the request against the graph and vector. Particular embodiments determine what path the incoming request likely performs and, based on the mapping, determines if the request falls within the serviceable risk profile for the customer and its request.

When the request falls within the serviceable risk profile, the call proceeds. When it does not, by policy particular embodiments may alert security personnel, block the call, alert the customer or a combination thereof.

Thus, an incoming request X at P is mapped onto a path (e.g., P, R, S, A) and particular embodiments then determine the vulnerability vector for request X (either statistically or precisely). If X's risk vulnerability and weakness acceptance is less than or equal to the vector, the call proceeds.

The implementation of the classification may be performed in the actual application, or e.g., in an Istio/Envoy side car.

Understanding the risks to a call graph is a continuous process. The graph may change over time.

Particular embodiments may use machine learning (ML)/(AI) techniques for the proper mapping of incoming requests onto the graph.

FIG. 2 is a flow diagram illustrating a method performed by a distributed cloud-native application, according to some embodiments. The steps of method 200 in FIG. 2 may be performed by distributed cloud-native application host server 300 described with respect to FIG. 3.

The method begins at step 212, where the distributed cloud-native application receives a request from a user to perform an operation. For example, in the airline application described above, a user may request to buy an airline ticket.

The user is associated with a risk profile. The risk profile may be used in the later steps to determine whether to perform the operation.

At step 214, the distributed cloud-native application determines a call path through the distributed cloud-native application to perform the operation. For example, the distributed cloud-native application may determine the call path based on the type of operation.

At step 216, the distributed cloud-native application classifies a risk level associated with the determined call path based on a distributed call graph. The distributed call graph comprises a risk value (e.g., risk vector) for each call path of a plurality of call paths through the distributed cloud-native application. Each call path comprises one or more distributed cloud-native application components. The risk value is based on a weakness rating associated with each component of the one or more distributed cloud-native application components in the call path.

An example distributed call graph is illustrated in FIG. 1. The distributed cloud-native application may classify the risk level according to any of the embodiments and examples described herein.

In particular embodiments, the weakness rating associated with each component of the one or more distributed cloud-native application components is based on a mapping of known vulnerabilities to image layers, images or libraries used to build the component. For example, particular embodiments may use CVEs, CWEs, and their mapping onto CVSS score, OWASP top 10 and OWASP API top 10 issues and extend these considerations to all HTTP end-points implemented by an application component (e.g., container).

In particular embodiments, the weakness rating associated with each component of the one or more distributed cloud-native application components is based on vulnerabilities discovered during testing (e.g., integration testing, chaos testing, fuzz testing, etc.) of the component.

In particular embodiments, the weakness rating associated with each component of the one or more distributed cloud-native application components is based on anomalies observed by external telemetry providers. The anomalies may include at least one of a compromised transport layer security implementation, expired certification, reputation of a service provider, service usage amount, known adware or malware, and domain name.

In particular embodiments, the distributed cell graph may be determined precisely or statistically, according to any of the embodiments and examples described herein.

At step 218, the distributed cloud-native application determines whether the risk level associated with the determined call path is acceptable based on the risk profile associated with the user. For example, in the airline application example described above the distributed cloud-native application determines whether the risk level associated with determined call path is acceptable when the user may be exposing credit card information during the purchase of an airline ticket. The risk profile associated with such a user may be fairly low and thus any call path with a significant risk level may be considered unacceptable.

In particular embodiments, determining the risk level may be based on input parameters. For example, if the request may comprise personally identifying information or financial information that decreases the risk tolerance for the user.

Upon determining the risk level associated with the determined call path is acceptable based on the risk profile associated with the user, the method continues to step 220 where the distributed cloud-native application performs the operation, such as purchasing an airline ticket.

Upon determining the risk level associated with the determined call path is not acceptable based on the risk profile associated with the user, the method continues to step 222 where the distributed cloud-native application blocks the operation. In particular embodiments, the distributed cloud-native application may log the event and/or notify security personnel about the event.

Security vulnerabilities may change over time. Accordingly, some embodiments may include step 224, where the distributed cloud-native application may obtain updates to its distributed call graph.

Modifications, additions, or omissions may be made to method 200 depicted in FIG. 2. Method 200 may include more, fewer, or other steps. Additionally, steps may be performed in parallel or in any suitable order.

FIG. 3 is a block diagram illustrating an example cloud-native application host server, according to particular embodiments. In particular embodiments, one or more servers 300 perform one or more steps of one or more methods described or illustrated herein. In particular embodiments, one or more servers 300 provide functionality described or illustrated herein, such as the functionality described with respect to FIGS. 1 and 2. In particular embodiments, software running on one or more servers 300 performs one or more steps of one or more methods described or illustrated herein or provides functionality described or illustrated herein. Particular embodiments include one or more portions of one or more servers 300. Herein, reference to a server may encompass a computing device, and vice versa, where appropriate. Moreover, reference to a server may encompass one or more servers, where appropriate.

Particular embodiments may include any suitable number of servers 300. Server 300 may take any suitable physical form. As example and not by way of limitation, server 300 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a server, or a combination of two or more of these. Where appropriate, server 300 may include one or more servers 300; be unitary or distributed; span multiple locations; span multiple machines; span multiple data centers; or reside in a cloud, which may include one or more cloud components in one or more networks.

Where appropriate, one or more servers 300 may perform without substantial spatial or temporal limitation one or more steps of one or more methods described or illustrated herein. As an example and not by way of limitation, one or more servers 300 may perform in real time or in batch mode one or more steps of one or more methods described or illustrated herein. One or more servers 300 may perform at different times or at different locations one or more steps of one or more methods described or illustrated herein, where appropriate.

In particular embodiments, server 300 includes a processor 302, memory 304, storage 306, an input/output (I/O) interface 308, a communication interface 310, and a bus 312. Although this disclosure describes and illustrates a particular server having a particular number of particular components in a particular arrangement, particular embodiments may include any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. Processor 302 may include any suitable number of any suitable internal caches, where appropriate.

As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302.

In particular embodiments, processor 302 may include one or more internal registers for data, instructions, or addresses. Processor 302 may include any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, particular embodiments may include any suitable processor.

In particular embodiments, memory 304 includes main memory for storing instructions for processor 302 to execute or data for processor 302 to operate on. As an example and not by way of limitation, server 300 may load instructions from storage 306 or another source (such as, for example, another computer system 700) to memory 304. Processor 302 may then load the instructions from memory 304 to an internal register or internal cache.

To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or else-where) and operates only on data in one or more internal registers or internal caches or in memory 304 (as opposed to storage 306 or elsewhere).

One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. Particular embodiments may include any suitable RAM. Memory 304 may include one or more memories 304, where appropriate. Although this disclosure describes and illustrates particular memory, particular embodiments may include any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to server 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 306 may take any suitable physical form. Storage 306 may include one or more storage control units facilitating communication between processor 302 and storage 306, where appropriate. Where appropriate, storage 306 may include one or more storages 306. Although this disclosure describes and illustrates particular storage, particular embodiments may include any suitable storage.

In particular embodiments, I/O interface 308 includes hardware, software, or both, providing one or more interfaces for communication between server 300 and one or more I/O devices. Server 300 may include one or more of these I/O devices, where appropriate. One or more of these I/O devices may enable communication between a person and server 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Particular embodiments may include any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, particular embodiments may include any suitable I/O interface. In particular embodiments, I/O interface 308 may include an interface to a remote network management system.

In particular embodiments, communication interface 310 includes hardware, software, or both providing one or more interfaces for communication (such as, for example, packet-based communication) between server 300 and one or more other servers 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network.

Particular embodiments may include any suitable network and any suitable communication interface 310 for it. As an example and not by way of limitation, server 300 may communicate with an ad hoc network, a personal area network (PAN), a LAN, WAN, MAN, or one or more portions of the Internet or a combination of two or more of these. One or more portions of one or more of these networks may be wired or wireless. As an example, server 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Server 300 may include any suitable communication interface 310 for any of these networks, where appropriate. Communication interface 310 may include one or more communication interfaces 310, where appropriate. Although this disclosure describes and illustrates a particular communication interface, particular embodiments may include any suitable communication interface.

In particular embodiments, bus 312 includes hardware, software, or both coupling com-ponents of server 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, particular embodiments may include any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

The invention claimed is:

1. A method performed by a distributed cloud-native application, the method comprising:
   testing one or more distributed cloud-native application components of the distributed cloud-native application;
   receiving a request from a user to perform an operation, wherein the user is associated with a risk profile;
   determining, based on the request, a call path through the distributed cloud-native application to perform the operation;
   classifying a risk level associated with the determined call path based on a distributed call graph, wherein the distributed call graph is generated prior to receiving the request and comprises a risk value for each call path of a plurality of call paths through the distributed cloud-native application and the risk value is determined after the testing and is based on a weakness rating associated with each component of the one or more distributed cloud-native application components in the call path;
   determining whether the risk level associated with the determined call path is acceptable based on the risk profile associated with the user; and
   upon determining the risk level associated with the determined call path is acceptable based on the risk profile associated with the user, performing the operation.

2. The method of claim 1, wherein the weakness rating associated with each component of the one or more distributed cloud-native application components is based on a mapping of known vulnerabilities to image layers, images or libraries used to build the component.

3. The method of claim 1, wherein the weakness rating associated with each component of the one or more distributed cloud-native application components is based on vulnerabilities discovered during the testing of the component.

4. The method of claim 3, wherein testing of the component comprises integration testing.

5. The method of claim 3, wherein testing of the component comprises at least one of chaos-testing and fuzz-testing.

6. The method of claim 1, wherein the weakness rating associated with each component of the one or more distributed cloud-native application components is based on anomalies observed by external telemetry providers.

7. The method of claim 6, wherein the anomalies include at least one of a compromised transport layer security implementation, expired certification, reputation of a service provider, service usage amount, known adware or malware, and domain name.

8. The method of claim 1, wherein the distributed call graph is determined statistically.

9. The method of claim 1, wherein the request comprises input parameters and determining whether the risk level associated with the determined call path is acceptable is based on the input parameters.

10. The method of claim 1, further comprising:

upon determining the risk level associated with the determined call path is not acceptable based on the risk profile associated with the user, blocking the operation.

11. The method of claim 1, further comprising obtaining updates to the distributed call graph.

12. A cloud-native application host server comprises:

a memory comprising instructions and a distributed call graph comprising a risk value for each call path of a plurality of call paths through a distributed cloud-native application and wherein each call path comprises one or more distributed cloud-native application components and the risk value is based on a weakness rating associated with each component of the one or more distributed cloud-native application components in the call path;

a hardware processor;

wherein the cloud-native application host server, when executing the instructions at the hardware processor, is configured to:

test the one or more distributed cloud-native application components, wherein the risk value for each call path of the plurality of call paths is determined after the testing;

receive a request from a user to perform an operation, wherein the user is associated with a risk profile;

determine, based on the request, a call path through the distributed cloud-native application to perform the operation;

classify a risk level associated with the determined call path based on the distributed call graph, wherein the distributed call graph is generated prior to receiving the request;

determine whether the risk level associated with the determined call path is acceptable based on the risk profile associated with the user; and upon determining the risk level associated with the determined call path is acceptable based on the risk profile associated with the user, perform the operation.

13. The cloud-native application host server of claim 12, wherein the weakness rating associated with each component of the one or more distributed cloud-native application components is based on a mapping of known vulnerabilities to image layers, images or libraries used to build the component.

14. The cloud-native application host server of claim 13, wherein the weakness rating associated with each component of the one or more distributed cloud-native application components is based on vulnerabilities discovered during the testing of the component.

15. The cloud-native application host server of claim 12, wherein the weakness rating associated with each component of the one or more distributed cloud-native application components is based on anomalies observed by external telemetry providers.

16. The cloud-native application host server of claim 15, wherein the anomalies include at least one of a compromised transport layer security implementation, expired certification, reputation of a service provider, service usage amount, known adware or malware, and domain name.

17. The cloud-native application host server of claim 12, wherein the distributed call graph is determined statistically.

18. The cloud-native application host server of claim 12, wherein the request comprises input parameters and determining whether the risk level associated with the determined call path is acceptable is based on the input parameters.

19. The cloud-native application host server of claim 12, wherein the cloud-native application host server is further configured to:

upon determining the risk level associated with the determined call path is not acceptable based on the risk profile associated with the user, block the operation.

20. The cloud-native application host server of claim 12, wherein the cloud-native application host server is further configured to obtain updates to the distributed call graph.

* * * * *